United States Patent
Molleo et al.

(10) Patent No.: US 10,836,928 B2
(45) Date of Patent: Nov. 17, 2020

(54) POLYOXAZOLINE CURING FOR PACKAGING COATING COMPOSITIONS

(71) Applicant: PPG Industries Ohio, Inc., Cleveland, OH (US)

(72) Inventors: Max Aaron Molleo, Loveland, OH (US); Hongying Zhou, Allison Park, PA (US); Carl Allen Seneker, Milford, OH (US); Christopher Paul Kurtz, Millvale, PA (US); Qin Li, Mason, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/844,047

(22) Filed: Dec. 15, 2017

(65) Prior Publication Data
US 2019/0185706 A1   Jun. 20, 2019

(51) Int. Cl.
| | | |
|---|---|---|
| *C09D 179/06* | (2006.01) | |
| *B65D 1/16* | (2006.01) | |
| *C08G 81/02* | (2006.01) | |
| *C09D 133/02* | (2006.01) | |
| *C09D 133/06* | (2006.01) | |
| *C09D 133/08* | (2006.01) | |
| *C09D 133/10* | (2006.01) | |
| *C09D 153/00* | (2006.01) | |

(52) U.S. Cl.
CPC ........... *C09D 179/06* (2013.01); *B65D 1/165* (2013.01); *C08G 81/024* (2013.01); *C09D 133/02* (2013.01); *C09D 133/068* (2013.01); *C09D 133/08* (2013.01); *C09D 133/10* (2013.01); *C09D 153/00* (2013.01)

(58) Field of Classification Search
CPC .. C09D 179/06; C09D 133/08; C09D 133/10; C09D 153/00; C09D 133/02; C09D 133/068; B65D 1/165; C08G 81/024
USPC ......................................................... 427/384
See application file for complete search history.

(56) References Cited

U.S. PATENT DOCUMENTS

| | | |
|---|---|---|
| 3,758,629 A | 9/1973 | Thill |
| 4,314,042 A | 2/1982 | Goto et al. |
| 4,562,225 A | 12/1985 | Huber et al. |
| 4,761,457 A | 8/1988 | Arita et al. |
| 6,465,582 B1 | 10/2002 | Higginbottom et al. |

FOREIGN PATENT DOCUMENTS

| | | | |
|---|---|---|---|
| EP | 3116044 A1 | | 1/2017 |
| GB | 1347066 | | 2/1974 |
| JP | 2006022127 A | | 1/2006 |
| JP | 2007269889 A | * | 10/2007 |
| JP | 2007269889 A | | 10/2007 |
| JP | 2008038101 A | | 2/2008 |
| WO | 2007102544 A1 | | 9/2007 |

OTHER PUBLICATIONS

JP 2007-269889 A—machine translation (Year: 2007).*

* cited by examiner

*Primary Examiner* — Ronald Grinsted
(74) *Attorney, Agent, or Firm* — Diane R. Meyers

(57) ABSTRACT

Coated packaging and methods for coating such packaging are disclosed. The coating compositions comprise a polymer comprising acid functionality and a polyoxazoline, wherein the coating composition is substantially free of formaldehyde. The coating compositions may be applied onto at least a portion of the interior and/or exterior of packaging, such as metal cans and can ends.

30 Claims, No Drawings

POLYOXAZOLINE CURING FOR PACKAGING COATING COMPOSITIONS

FIELD OF THE INVENTION

The present invention relates to a package coated at least in part with a coating composition comprising a polymer comprising acid functionality and a polyoxazoline.

BACKGROUND OF THE INVENTION

A wide variety of coatings have been used to coat the surfaces of food and beverage packaging. For example, metal cans are sometimes coated using coil coating or sheet coating operations; that is, a coil or sheet of steel or aluminum is coated with a suitable composition and cured. The coated substrate is then formed into the can body or can end. Alternatively, the coating composition may be applied, for example, by spraying and dipping, to the formed can and then cured. Coatings for food and beverage packaging is often capable of high speed application to the substrate and provides the necessary properties when cured to perform in a demanding end use environment. For example, the coating should be safe for food contact. The use of coatings made without formaldehyde are increasingly desired.

SUMMARY OF THE INVENTION

The present invention provides a package coated at least in part on a surface, the coating composition comprising:
(a) a polymer comprising acid functionality, and
(b) a polyoxazoline, wherein the coating composition is substantially free of formaldehyde.

The invention also provides a method of coating a package comprising:
(a) applying such a coating composition to at least a portion of the package, prior to and/or after forming the package; and
(b) heating the coated substrate to a temperature and for a time sufficient to cure the coating composition.

DETAILED DESCRIPTION

As used herein, the term "organic moiety" or "organic group" means a hydrocarbon group (with optional elements other than carbon and hydrogen, such as oxygen, nitrogen, sulfur, and silicon) that is classified as an aliphatic group, cyclic group, including cycloaliphatic and aromatic, or combination of aliphatic and cyclic groups (e.g., alkaryl and aralkyl groups). The term "aliphatic group" means a saturated or unsaturated linear or branched hydrocarbon group. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "cyclic group" or "cyclic radical" means a closed ring hydrocarbon group or radical that may be alicyclic group or aromatic group, both of which can include heteroatoms. The term "alicyclic group" means a cyclic hydrocarbon group having properties resembling those of aliphatic groups such as cycloaliphatic.

A group that may be the same or different is referred to as being "independently" something.

Substitution may occur on the organic moieties of the compounds according to the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl groups consisting of hydrogen and carbon only, such as methyl, ethyl, propyl, t-butyl, and the like, but also alkyl groups bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc.

As used herein, the term "polyoxazoline" means a compound containing at least two (2) oxazoline groups. Said compound may be monomeric or polymeric.

As used herein, the terms "carboxylic acid" and "carboxyl" may be used interchangeably. A "polymer comprising acid functionality" also means a polymer having at least one unreacted carboxylic acid group, but it can be prepared by any means known in the art.

The terms "crosslinker", "curing agent" or "crosslinking agent" refer to a molecule capable of forming a covalent linkage between two or more moieties, e.g. two moieties being present in two different polymeric molecules or between two different regions of the same polymer.

The term "dispersed in aqueous medium" means that the polymer comprising acidic functionality and the polyoxazoline crosslinker can be mixed into aqueous medium to form a stable mixture; that is, the mixture does not separate into immiscible layers within an hour after mixing when left to stand at room temperature (23° C.).

The term "latex" means a polymer that is polymerized by free radical initiated emulsion polymerization techniques in aqueous medium. The polymer is in particulate form and dispersed in aqueous medium.

The term "food-contacting surface" refers to the surface of a package such as an inner surface of a food or beverage package that is in contact with, or intended for contact with, a food or beverage product. By way of example, an interior surface of a metal substrate of a food or beverage package, or a portion thereof such as a can end or a can body, is a food-contacting surface even if the interior metal surface is coated with a coating composition.

The term "colorant" means any substance that imparts color and/or other opacity and/or other visual effect to the composition. As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; ferried yellow; quindo red; and combinations thereof, and those listed in Article 178.3297 of the Code of Federal Regulations, which is incorporated by reference herein.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Acrylic and methacrylic monomers and polymers are designated as (meth)acrylic monomers and polymers.

Molecular weights are on a number average or weight average basis unless otherwise indicated and are determined by gel permeation chromatography using polystyrene standards.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polymer comprising acid functionality, "a" polyoxazoline, "a" film forming resin, "an" isocyanate, "an" alkanol amine, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 4 to 5, etc.).

"Glass Transition Temperature" or Tg is determined by Differential Scanning calorimetry (DSC) at a heating rate of 20° C./min, generally to a temperature of 280-300° C., in a nitrogen atmosphere. See ASTM 1356.

The present invention is directed to a package coated at least in part with a coating composition comprising (a) a polymer comprising acid functionality and (b) a polyoxazoline. The coating composition is substantially free, and may be essentially free and/or completely free of formaldehyde.

The polyoxazolines of the present invention may be monomeric or polymeric in nature. The monomeric polyoxazolines may have the structure:

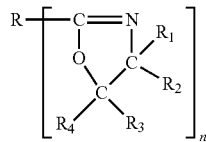

(1)

wherein n is an integer of 2 to 4; R is an n-valent organic group such as an arylene or an alkylene radical; $R_1$, $R_2$, $R_3$ and $R_4$ may be the same or different and each independently are selected from hydrogen and $C_1$-$C_4$ alkyl groups, such as substituted or unsubstituted methyl, ethyl, propyl and butyl.

Specific examples of the compound of the above formula are as follows:
1,2-phenylene-bis-oxazoline
1,3-phenylene-bis-oxazoline
1,4-phenylene-bis-oxazoline
1,2-bis(oxazolinyl-4-methyl)benzene
1,3-bis(oxazolinyl-4-methyl)benzene
1,4-bis(oxazolinyl-4-methyl)benzene
1,2-bis(oxazolinyl-5-ethyl)benzene
1,3-bis(oxazolinyl-5-methyl)benzene
1,3-bis(oxazolinyl-5-ethyl)benzene
1,4-bis(oxazolinyl-5-ethyl)benzene
1,2,4-tris(oxazolinyl)benzene
1,2,4,5-tetrakis(oxazolinyl)benzene Examples of other monomeric polyoxazolines are those of the structure:

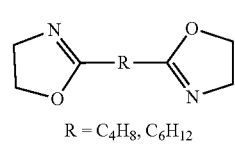

R = $C_4H_8$, $C_6H_{12}$ (2)

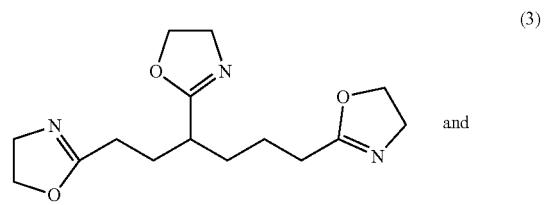

and (3)

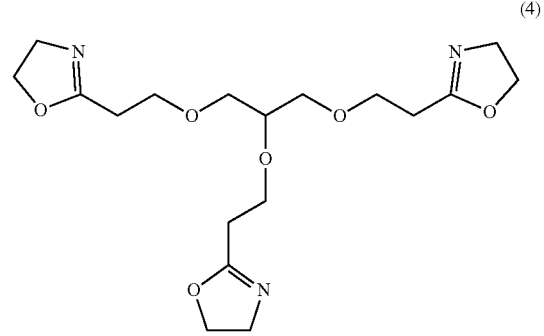

(4)

Also, polymeric polyoxazolines may be used, such as those disclosed in co-pending Ser. No. 15/843,914 filed on even date herewith and incorporated by reference herein. An example would be the reaction product of a polymer containing terminal carboxylic acid groups such as a polyester polymer reacted with a bis-oxazoline. An example of such a polymeric polyoxazoline would be that of the structure:

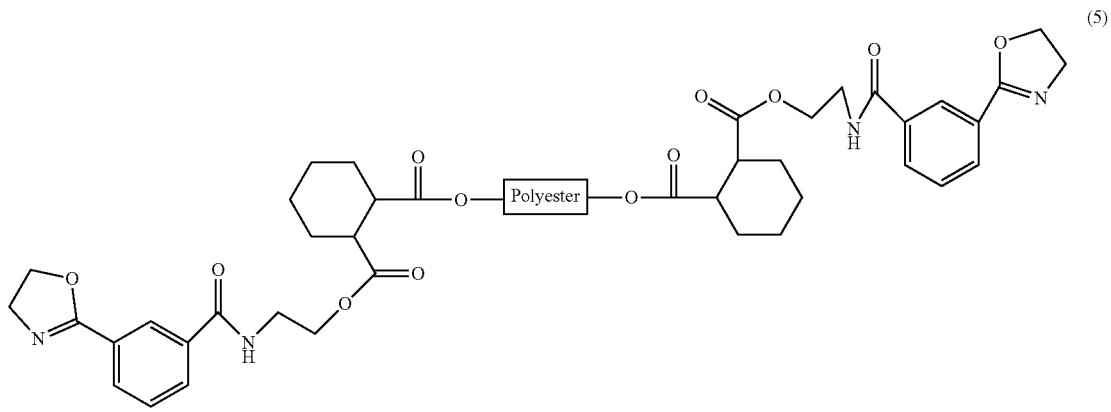 [SMILES: COC(=O)C1CCCCC1C(=O)OCCNC(=O)c1cccc(C2=NCCO2)c1 ; COC(=O)C1CCCCC1C(=O)OCCNC(=O)c1cccc(C2=NCCO2)c1]

(5)

Such polyester polyoxazolines may have number average molecular weights of 1,000-10,000.

The polymeric polyoxazoline can be a polymer made by carrying out an addition polymerization reaction of an addition polymerizable oxazoline-containing monomer and at least one other addition polymerizable monomer, i.e., a (meth)acrylic polymer polyoxazoline.

The addition polymerizable oxazoline can be represented by the following structural formula:

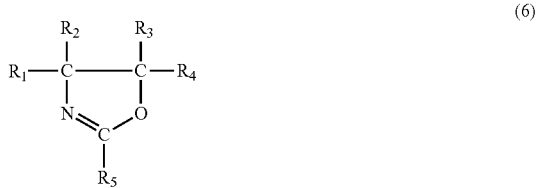

where $R_1$, $R_2$, $R_3$ and $R_4$ are as defined above in reference to formula (1) and $R_5$ denotes an organic group having an addition polymerizable double bond.

Examples are, for example, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline; and one kind or a mixture of two or more kinds selected from these groups can be used.

The other addition polymerizable monomer is not limited since it is a monomer not reactive with an oxazoline group and capable of copolymerizing with the addition-polymerizable oxazoline monomer and can comprise, for example, (meth)acrylic acid esters such as methyl (meth)acrylate, butyl (meth)acrylate and 2-ethylhexyl (meth)acrylate; unsaturated nitriles such as (meth)acrylonitrile; unsaturated amides such as (meth)acrylamide and N-methylol(meth)acrylamide; vinyl esters such as vinyl acetate and vinyl propionate; vinyl ethers such as methyl vinyl ether and ethyl vinyl ether; alpha-olefins such as ethylene and propylene; halogen-containing alpha, beta-unsaturated monomers such as vinyl chloride, vinylidene chloride and vinyl fluoride; alpha, beta-unsaturated aromatic monomers such as styrene and alpha-methylstyrene; and one kind or a mixture of two or more of these monomers can be used.

Such polymeric polyoxazolines may have a number average molecular weights of 10,000 to 50,000 and oxazoline equivalent weights of 100-5,000. Such polymeric polyoxazolines are commercially available from Nippon Shokubai, e.g. as EPOCROS WS-300, WS-500 and WS-700.

The polyoxazolines as described above are used as a crosslinker in thermosetting organic solvent or water-based coating compositions in combination with a polymer comprising acid functionality.

The polymer comprising acid functionality may be, for example, a carboxylic acid group-containing polyester polymer, a (meth)acrylic polymer, a carboxylic acid functional polyamide, polyurethane or polyether, including mixtures thereof.

The carboxylic acid group-containing polyester polymer can be prepared by condensation in the conventional manner.

The carboxylic acid group-containing polyester polymer can be produced from a polyol component and a polyacid component.

Examples of polyols are those having two or more hydroxy groups within each molecule, such as triols such as trimethylolpropane and hexanetriol, and diols such as propylene glycol, neopentyl glycol, butylene glycol, hexylene glycol, octylene glycol, 1,6-hexanediol, 1,8-octanediol, 1,9-nonanediol, 1,10-decanediol, 1,12-dodecanediol, 1,2-cyclohexanediol, 1,3-cyclohexanediol, 1,4-cyclohexanediol, hydrogenated bisphenol A, caprolactone diol and bishydroxyethyltaurine.

Examples of polyacids are those having two or more carboxyl groups within each molecule, for example aromatic dicarboxylic acids such as phthalic acid and isophthalic acid, aliphatic dicarboxylic acids such as adipic acid, azelaic acid and tetrahydrophthalic acid, and tricarboxylic acids such as trimellitic acid. The carboxyl-functional polyesters typically have acid values of at least 2, such as 5 to 100 and hydroxyl values less than 200, such as 20 to 150.

The carboxylic acid group-containing (meth)acrylic polymer can be obtained in the conventional manner, specifically by solution or emulsion polymerization.

For example, the carboxylic acid group-containing (meth)acrylic polymer can be obtained from a carboxylic acid group-containing ethylenically unsaturated monomer and another ethylenically unsaturated monomer.

The carboxylic acid group-containing ethylenically unsaturated monomer can be acrylic acid, methacrylic acid, ethacrylic acid, crotonic acid, maleic acid, fumaric acid, itaconic acid, half esters thereof such as maleic acid ethyl ester, fumaric acid ethyl ester and itaconic acid ethyl ester, succinic acid mono (meth)acryloyloxyethyl ester, phthalic acid mono(meth)acryloyloxyethyl ester and the like. The carboxylic acid group-containing ethylenically unsaturated monomer may comprise two or more species.

The other ethylenically unsaturated monomer may include hydroxy-containing ethylenically unsaturated monomers such as 2-hydroxyethyl acrylate, 2-hydroxyethyl methacrylate, 4-hydroxybutyl acrylate, and 4-hydroxybutyl methacrylate. Also, epoxy-functional monomers such as glycidyl methacrylate may be used. Nonfunctional ethylenically unsaturated monomers such as styrene, alpha-methylstyrene, acrylate esters (e.g. methyl acrylate, ethyl acrylate, butyl acrylate, 2-ethylhexyl acrylate) and methacrylate esters (e.g. methyl methacrylate, ethyl methacrylate, butylmethacrylate, isobutylmethacrylate, tert-butyl methacrylate, 2-ethylhexyl methacrylate, lauryl methacrylate) are typically present. The above other ethylenically unsaturated monomer may comprise two or more species. The carboxylic acid group-containing (meth)acrylic polymers typically have acid values of at least 2, such as 5 to 100. (Meth)acrylic polymers having both carboxylic acid functionality and epoxy functionality are of particular interest.

The molar ratio of oxazoline to carboxylic acid can range from 0.03:1 to 5:1, such as from 0.05:1 to 2:1.

The carboxylic acid group-containing polymer and polyoxazoline curing agent can be formulated in an organic solvent or can be dispersed in aqueous medium. For organic solvent-based compositions, in which 50% or greater of the solvent is organic solvent, the organic solvent is selected to have sufficient volatility to evaporate essentially entirely from the coating composition during the curing process such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. The resin solids content of the carboxylic acid group-containing polymer and polyoxazoline in the organic solvent-based composition is typically from 10 to 70, such as 25 to 50 percent by weight based on total weight of solution.

The coating compositions used in the invention can also be in the form of an aqueous dispersion in which the resinous phase is dispersed in aqueous medium. The aqueous medium of the dispersion may consist entirely of water in some cases but, more commonly, will consist of a mixture of water and water-soluble or water-miscible organic solvents. Suitable organic solvents are the ether type alcohols, such as ethylene glycol monobutyl ether (Butyl Cellosolve), ethylene glycol monoethyl ether (Ethyl Cellosolve) and the like, and lower alkanols having 2 to 4 carbon atoms such as ethanol, propanol, isopropanol, butanol, and the like. Minor proportions of hydrocarbon solvents such as xylene, toluene, and the like may also be present in the aqueous medium. The aqueous medium may contain from about 60 percent to about 100 percent by weight of water and from about 0 percent to about 40 percent by weight of organic solvent. The percentage by weight is based on total weight of the aqueous medium, i.e. the total weight of water and organic solvent(s).

To disperse the resinous phase in the aqueous medium, the carboxylic acid group-containing polymer is at least partially neutralized with a base such as an amine. Examples of amines include ammonia, monoethanolamine and diethanolamine. Typically, the amine will neutralize at least 25 percent, such as at least 50 percent of the acid equivalents in the carboxylic acid group-containing polymer.

The polyoxazoline can then be combined with the salt of the polymer comprising acid functionality and the mixture dispersed in the aqueous medium. The resin solids content of the aqueous dispersion is typically from 10 to 70, such as 25 to 50 percent by weight based on total weight of the aqueous dispersion.

The aqueous dispersion may also be in the form of a latex in which the monomers, typically (meth)acrylic monomers, used in preparing the polymers are emulsified in aqueous medium and polymerized to form a high molecular weight polymer. Examples of suitable latex polymers are disclosed in U.S. Pat. Nos. 5,717,539 and 4,988,781. Ethylene-acrylic acid copolymer lattices available from Dow Packaging as PRIMACOR may be used.

Besides the polymer comprising acid functionality, the coating compositions used in the present invention may also include optional ingredients that do not adversely affect the coating composition or a cured coating composition resulting therefrom. Such optional ingredients are typically included in a coating composition to enhance composition aesthetics to facilitate manufacturing, processing, handling and application of the composition, and to further improve the particular functional property of a coating composition or a cured coating composition resulting therefrom.

Such optional ingredients include, for example, catalysts, colorants, fillers, lubricants, anticorrosive agents, flow agents, thixotropic agents, dispersing agents, antioxidants, adhesion promoters, and mixtures thereof. Each optional ingredient is included in a sufficient amount to serve its intended purpose, but not in such amount to adversely affect the coating composition or a cured coating composition resulting therefrom.

The polymer comprising acid functionality, the polyoxazoline and/or the resultant coating compositions may be substantially free, may be essentially free and/or may be completely free of bisphenol A and derivatives or residues thereof, including bisphenol A ("BPA") and bisphenol A diglycidyl ether ("BADGE"). Such polymer comprising acid functionality, polyoxazoline and/or resultant coating compositions are sometimes referred to as "BPA non intent" because BPA, including derivatives or residues thereof, are not intentionally added but may be present in trace amounts because of impurities or unavoidable contamination from the environment. The polymer comprising acid functionality, the polyoxazoline and/or the resultant coating compositions can also be substantially free and may be essentially free and/or may be completely free of bisphenol F ("BPF") and derivatives or residues thereof, including bisphenol F and bisphenol F diglycidyl ether ("BFDGE"). The term "substantially free" as used in this context means the polymer comprising acid functionality, the polyoxazoline and/or the resultant coating compositions contain less than 1000 parts per million (ppm), "essentially free" means less than 100 ppm and "completely free" means less than 20 parts per billion (ppb) of any of the above-mentioned compounds, derivatives or residues thereof.

In addition, the polymer comprising acid functionality, the polyoxazoline and/or the resultant coating compositions of the present invention may be substantially free, may be essentially free and/or may be completely free of formaldehyde. The term "substantially free" as used in this context means the polymer comprising acid functionality, the polyoxazoline and/or the resultant coating compositions contain, and/or release on cure, less than 1000 parts per million (ppm), "essentially free" means less than 100 ppm and "completely free" means less than 100 parts per billion (ppb) of formaldehyde compounds, derivatives or residues thereof.

The compositions of the present invention are suitable for use as packaging coatings. The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents form contacting the metal of the package. Contact between the metal and a food or beverage, for example, can lead to corrosion of a metal package, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include tin-plated steel, tin-free steel and black-plated steel.

The present invention is therefore further directed to a method of coating a package comprising applying at least a portion of the package any of the coating compositions described above, and curing the coating. Two-piece cans are manufactured by joining a can body (typically a drawn metal body) with a can end (typically a drawn metal end). The coatings of the present invention are suitable for use in food contact situations and may be used on the inside of such cans. They are particularly suitable for spray applied, liquid coatings for the interior of two-piece drawn and ironed beverage cans and coil coatings for food can ends. The present invention also offers utility in other applications. These additional applications include, but are not limited to, wash coating, sheet coating, and side seam coatings (e.g., food can side seam coatings).

Spray coating includes the introduction of the coating composition into the inside of a preformed package. Typical preformed packages suitable for spray coating include food cans, beer and beverage packages, and the like. The spray may utilize a spray nozzle capable of uniformly coating the inside of the preformed package. The sprayed preformed package is then subjected to heat to remove the residual solvents and harden the coating. For food inside spray, the curing conditions involve maintaining the temperature measured at the can dome at 350 to 500° F. for 0.5 to 30 minutes.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as 2-piece drawn food cans, 3-piece food cans, food can ends, drawn and ironed cans and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition.

The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically require a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polymeric polyoxazoline, "a" film forming resin, "an" isocyanate, "an" alkanol amine, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to.

Aspects of the Invention

Non-limiting aspects of the present invention include:
1. A package coated at least in part on a surface, the coating composition comprising:
   (a) a polymer comprising acid functionality, and
   (b) a polyoxazoline, wherein the coating composition is substantially free of formaldehyde.
2. A method of coating a package comprising:
   (a) applying the coating composition of aspect 1 to at least a portion of the package, prior to and/or after forming the package or part of the package; and
   (b) heating the coated substrate to a temperature and for a time sufficient to cure the coating composition.
3. The coated package of aspect 1 or the method of aspect 2 in which the package is a metal can.
4. The coated package or the method of aspect 3 in which the coating composition is applied to the food-contacting surface of the can and/or a can end.
5. The coated package or the method of any one of the preceding aspects in which the composition is either an organic solvent-based composition or an aqueous-based composition in which the polymer comprising acid functionality and the polyoxazoline are dispersed in aqueous medium.
6. The coated package or the method of any one of the preceding aspects in which the calculated molar ratio of oxazoline groups to carboxylic acid groups is from 0.03:1 to 5:1.
7. The coated package or the method of any one of the preceding aspects in which the polyoxazoline has the following structure:

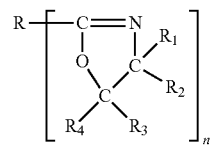

wherein n is an integer of 2 to 4; R is an n-valent organic group; $R_1$, $R_2$, $R_3$ and $R_4$ may be the same or different and each independently are selected from hydrogen and substituted or unsubstituted $C_1$-$C_4$ alkyl groups.
8. The coated package or the method of aspect 7 where $R_2$ and $R_3$ are H and/or R is a divalent radical selected from an arylene radical and an alkylene radical.
9. The coated package or the method of any one of aspects 1 to 6 in which the polyoxazoline comprises polymeric polyoxazoline.
10. The coated package or the method of aspect 9 in which the polymeric polyoxazoline comprises a polyester polyoxazoline or a (meth)acrylic polymer polyoxazoline.
11. The coated package or the method of aspect 9 or 10 in which the polyoxazoline has a number average molecular weight of 1,000-50,000.
12. The coated package or the method of any one of the preceding aspects in which the polymer comprising acid functionality comprises a carboxylic acid group-containing (meth)acrylic polymer, a carboxylic acid group-containing polyester polymer, a carboxylic acid group-containing epoxy polymer, a carboxylic acid functional polyamide, a carboxylic acid functional polyurethane or a carboxylic acid functional polyether, including mixtures thereof, and may comprise a carboxylic acid group-containing (meth)acrylic polymer, a carboxylic acid group-containing polyester polymer, or mixtures thereof.
13. The method of any one of aspects 2 to 12 in which the coating is applied to the package before and/or after forming the package.
14. The method of any one of aspects 2 to 12 in which the coating composition is applied to a planar substrate; the coating composition heated for a time and temperature sufficient to cure the coating composition; and the substrate is formed into a package or a portion thereof.
15. The method of aspect 14 in which the coating composition is applied continuously to a length of coil metal sheet stock.

EXAMPLES

The following examples are offered to aid in understanding of the present invention and are not to be construed as limiting the scope thereof. Unless otherwise indicated, all parts and percentages are by weight.

Polyoxazolines

The following polyoxazolines were used in the Examples that follow:

Example A 1,3-phenylene-bis-oxazoline

Example B 1,4-butylene-bis-oxazoline

Example D 1,2,3-propylene-tris-oxazoline

Example E

Tetra-Functional Oxazoline

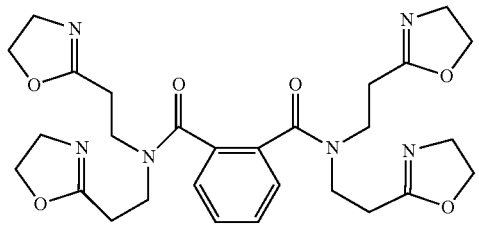 [SMILES: O=C(c1ccccc1C(=O)N(CCC1=NCCO1)CCC1=NCCO1)N(CCC1=NCCO1)CCC1=NCCO1]

Example F

Polymeric Polyoxazoline EPOCROS WS-500 from Nippon Shokubai Mn=20,000, oxazoline equivalent weight=220.

Example G

The phenolic crosslinker HRJ-13078 from the SI Group was used for comparison purposes.

The following acid functional (meth)acrylic polymers were used in the Examples that follow:

Example H

| Acid-Functional (Meth)acrylic Polymer | | |
|---|---|---|
| | Name | Amount [g] |
| Charge #1 | Butanol | 173.93 |
| Charge #2 | 2-Butoxyethanol | 275.70 |
| Charge #3 | Methyl Methacrylate | 45.33 |
| Charge #4 | Methacrylic Acid | 272.01 |
| Charge #5 | Ethyl Acrylate | 589.35 |
| Charge #6 | t-Butyl Peroxyacetate (50%)* | 21.95 |
| Charge #7 | 2-Butoxyethanol | 58.68 |
| Charge #8 | 2-Butoxyethanol | 34.23 |
| Charge #9 | Isopropanol | 6.37 |
| Charge #10 | t-Butyl Peroxyacetate (50%) | 2.28 |
| Charge #11 | 2-Butoxyethanol | 12.29 |

| Acid-Functional (Meth)acrylic Polymer | | |
|---|---|---|
| | Name | Amount [g] |
| Charge #12 | t-Butyl Peroxyacetate (50%) | 2.28 |
| Charge #13 | 2-Butoxyethanol | 22.65 |
| Charge #14 | 2-Butoxyethanol | 44.40 |
| Charge #15 | 2-Butoxyethanol | 738.55 |

*in mineral spirits

1. Set reactor for reflux and turn condenser on and nitrogen on sparge. The reactor had separate monomer and initiator feed lines.
2. Pump Charges #1 and 2 to reactor. Heat reactor slowly to 133° C. and maintain steady reflux with solvents.
3. Pump Charges #3-7 into the reactor over 180 minutes, maintaining a batch temperature of 133° C. throughout the addition.
4. Once the monomers and initiators are in the reactor, add Charges #8 and 9 through the monomer feed line as a rinse.
5. Pump Charges #10 and 11 through the initiator feed line and hold the batch at 133° C. for 15 minutes.
6. Pump Charges #12 and 13 through the initiator feed and hold the batch at 133° C. for 60 minutes. During this time, add Charge #14 through the initiator feed line as a rinse.
7. Pump Charge #15 to the flask while cooling the resin down to room temperature. The final solids concentration (measured by a 400° F. bake for 10 minutes) was 38.99% total non-volatile (TNV), the final viscosity (measured by Gardner-Holdt bubble tubes) was M+, and the final acid value was 81.3 on sample (208.5 on solids). The theoretical Tg of this acrylic polymer, as calculated by the Flory-Fox equation, is 23° C. The Mn of the polymer was 4657 and the Mw was 14,296.

Example I

| Acid-Functional (Meth)acrylic Polymer | | |
|---|---|---|
| | Name | Amount [g] |
| Charge #1 | Butanol | 173.93 |
| Charge #2 | 2-Butoxyethanol | 275.70 |
| Charge #3 | Methyl Methacrylate | 172.27 |
| Charge #4 | Methacrylic Acid | 353.61 |
| Charge #5 | Ethyl Acrylate | 380.81 |
| Charge #6 | t-Butyl Peroxyacetate (50%) | 65.85 |
| Charge #7 | 2-Butoxyethanol | 58.68 |
| Charge #8 | 2-Butoxyethanol | 34.23 |
| Charge #9 | Isopropanol | 6.37 |
| Charge #10 | t-Butyl Peroxyacetate (50%) | 2.28 |
| Charge #11 | 2-Butoxyethanol | 12.29 |
| Charge #12 | t-Butyl Peroxyacetate (50%) | 2.28 |
| Charge #13 | 2-Butoxyethanol | 22.65 |
| Charge #14 | 2-Butoxyethanol | 44.40 |
| Charge #15 | 2-Butoxyethanol | 749.35 |

1. Set reactor for reflux and turn condenser on and nitrogen on sparge. The reactor had separate monomer and initiator feed lines.
2. Pump Charges #1 and 2 to reactor. Heat reactor slowly to 133° C. and maintain steady reflux with solvents.
3. Pump Charges #3-7 into the reactor over 180 minutes, maintaining a batch temperature of 133° C. throughout the addition.

4. Once the monomers and initiators are in the reactor, add Charges #8 and 9 through the monomer feed line as a rinse.
5. Pump Charges #10 and 11 through the initiator feed line and hold the batch at 133° C. for 15 minutes.
6. Pump Charges #12 and 13 through the initiator feed and hold the batch at 133° C. for 60 minutes. During this time, add Charge #14 through the initiator feed line as a rinse.
7. Pump Charge #15 to the flask while cooling the resin down to room temperature. The final solids concentration (measured by a 400° F. bake for 10 minutes) was 38.66% TNV, the final viscosity (measured by Gardner-Holdt bubble tubes) was T, and the final acid value was 32.1 on sample (83.0 on solids). The theoretical Tg of this acrylic, as calculated by the Flory-Fox equation, is 57° C. The Mn of the polymer was 3796 and the Mw was 9519.

Example J

| Polyethylene-Acrylic Acid Aqueous Dispersion | | |
|---|---|---|
| | Ingredient | Amount [g] |
| Charge #1 | PRIMACOR 5980i* | 900.00 |
| Charge #2 | DI Water | 3438.67 |
| Charge #3 | Dimethylethanolamine | 111.33 |
| Charge #4 | DI Water | 50.00 |

*Polyethylene-acrylic acid copolymer from Dow Packaging.

1. Set reactor for reflux and turn condenser on and nitrogen on sparge.
2. Add Charges #1 and 2 to reactor. Heat reactor slowly to 98° C. Once heating has started and mixture is under agitation, slowly pump Charge #3 to the reactor. Use Charge #4 as a line rinse.
3. Hold at 98° C. until the PRIMACOR polymer has fully dissolved.

Example K

| Acid-Functional Latex | | |
|---|---|---|
| | Ingredient | Amount [g] |
| Charge #1 | Example J | 1939.15 |
| Charge #2 | DI Water | 737.52 |
| Charge #3 | Hydrogen Peroxide 35% Aq | 11.76 |
| Charge #4 | DI Water | 70.55 |
| Charge #5 | DI Water | 2.84 |
| Charge #6 | Glycidyl Methacrylate | 26.67 |
| Charge #7 | Ethyl Acrylate | 417.86 |
| Charge #8 | Methyl Methacrylate | 444.53 |
| Charge #9 | Benzoin | 11.76 |
| Charge #10 | DI Water | 30.98 |

1. Set reactor for reflux and turn condenser on and nitrogen on sparge. The reactor had separate monomer and initiator feed lines.
2. Add Charges #1 and 2 to the reactor, heat the reactor slowly to 70° C.
3. Pump Charges #3 and 4 to the reactor over 125 minutes. Five minutes after starting this addition, pump Charges #6, 7, and 8 to the reactor over 120 minutes. Both of these additions should finish at the same time.
4. Once the monomer and initiator additions have been completed, add Charges #5 and 10 as initiator and monomer line rinses, respectively. Hold the batch at 70° C. for 10 minutes. Cool the batch down to room temperature and filter through a 10 micron filter bag.
5. The final solids concentration (measured by a 400° F. bake for 10 minutes) was 34.63% TNV, the final viscosity (measured by a Brookfield viscometer at 25° C., 100 rpm, and using a #3 spindle) was 84 cP, and the final acid value was 14.2 on sample (41.0 on solids).

Example L

| Polyethylene-Acrylic Acid Aqueous Dispersion | |
|---|---|
| Ingredient | Parts by Weight |
| PRIMACOR 5980i | 266 |
| Dimethylethanolamine | 32.9 |
| Propylene Glycol | 425.6 |
| DI Water | 605.5 |

To a 5 L four-neck reaction flask was added the following: 266 g PRIMACOR 5980i, 32.9 g dimethylethanolamine, 425.6 g propylene glycol, and 605.5 g deionized water. The flask was then fitted with a thermocouple, water condenser, stirring blade, and a nitrogen blanket. While under agitation the contents of the flask were heated to 95° C. and held for 2 hours until the mixture became visually homogeneous. The mixture was then allowed to cool to 70° C.

Example M

| Acid-Functional Latex | |
|---|---|
| Ingredient | Parts by Weight |
| Example L | 1330.0 |
| Benzoin | 8.1 |
| Ethyl Acrylate | 292.4 |
| Glycidyl Methacrylate | 18.7 |
| Methyl Methacrylate | 311.0 |
| Hydrogen Peroxide (35%) | 6.2 |
| DI Water | 97.6 |

To the dispersion of Example L was added the benzoin. Added dropwise to the dispersion over 2 hours was a mixture of the (meth)acrylic monomers. Added in a separate feed over the same time frame was a mixture of the hydrogen peroxide and deionized water. After the feeds have finished, the latex was held for 30 minutes. A mixture of 1.05 g of 35% hydrogen peroxide and 9.0 g deionized water was then added and the latex was held for 30 minutes. Another mixture of 1.05 g of 35% hydrogen peroxide and 9.0 g deionized water was then added and the latex was held for 90 minutes. After the 90 minute hold, the latex was allowed to cool to less than 60° C. The final product was filtered using a 5 μm filter bag.

The final latex had a measured solid content of 30.5% and a theoretical acid value of 11.2 mg KOH/g.

Coating Formulations

Example 1

Acid-Functional Acrylic Polymer Formulated with 10% 1,3-Phenylene-Bis-Oxazoline (1,3-PBO)

1,3-phenylene-bis-oxazoline (2.01 g) was mixed with the acid-functional acrylic Example H (46.4 g) to make a 10% by weight mixture. This material was thinned down to 40% TNV by adding 1.84 g 2-butoxyethanol.

Example 2

Acid-Functional Acrylic Polymer Formulated with 20% 1,3-PBO 1,3-phenylene-bis-oxazoline (5.01 g) was mixed with the acid-functional acrylic Example H (51.4 g) to make a 20% by weight mixture. This material was thinned down to 40% TNV by adding 6.22 g 2-butoxyethanol.

Example 3

Acid-Functional Acrylic Polymer Formulated with 10% 1,3-PBO 1,3-phenylene-bis-oxazoline (2.30 g) was mixed with the acid-functional acrylic Example I (53.5 g) to make a 10% by weight mixture. This material was thinned down to 40% TNV by adding 6.5 g 2-butoxyethanol.

Example 4

Acid-Functional Acrylic Polymer Formulated with 20% 1,3-PBO 1,3-phenylene-bis-oxazoline (4.84 g) was mixed with the acid-functional acrylic Example H (50.1 g) to make a 20% by weight mixture. This material was thinned down to 40% TNV by adding 5.59 g 2-butoxyethanol.

The coating compositions of Examples 1, 2, 3 and 4 were drawn down on aluminum panels and cured to a Peak Metal Temperature of 465° F. (241° C.) for 10 seconds. Panels with the cured coating were measured for Pencil Hardness, flexibility as measured by wedge bends, blush, adhesion and solvent fraction. The results are reported in the table below. Larger proportions of 1,3-phenylene-bis-oxazoline increased the crosslink density of the film, which is observed by the decreased solvent fraction values of Examples 2 and 4 (compared with Examples 1 and 3, respectively). The smaller wedge bend values of Examples 2 and 4 indicate that the flexibility of these coatings were also enhanced by increased 1,3-phenylene-bis-oxazoline concentrations. These improvements to the coatings did not impact their blush or adhesion performances following pasteurization in Joy, Dowfax, or Acetic Acid solutions or following retort in DI water.

| Coating | Drawbar | RT Pencil Hardness[1] | Wedge Bend (mm)[2] | msi | % Solvent Fraction[9] | 1% Joy[5] 10' @ 180 F. Blush[3] | Adh.[4] | 0.165% Dowfax[6] 15' @ Boil Blush | Adh. | 3% Acetic Acid[7] 30' @ Boil Blush | Adh. | DI $H_2O$ Retort[8] 30' @ 250 F. Blush | Adh. |
|---|---|---|---|---|---|---|---|---|---|---|---|---|---|
| Ex. 1 | 18 | H | 100 | 6.86 | 17.50 | 6 | 10 | 7 | 10 | 6 | 10 | 7 | 10 |
| Ex. 2 | 18 | 2H | 32 | 6.7 | 3.11 | 7 | 10 | 7 | 10 | 5 | 10 | 7 | 10 |
| Ex. 3 | 18 | 3H | 72 | 7.44 | 7.97 | 6 | 10 | 7 | 10 | 7 | 10 | 7 | 10 |
| Ex. 4 | 18 | 3H | 29 | 7.13 | 1.69 | 7 | 10 | 7 | 10 | 7 | 10 | 7 | 10 |

Test Methods

The following test methods were utilized in the Examples.

[1] Pencil Hardness determined in accordance with ASTM D3363-92a.

[2] Flexibility was evaluated with a wedge bend test. For this test, coated panels were cut into 2 inch by 4.5 inch pieces, with the substrate grain running perpendicular to the long length of the cut panel. They were then bent over a ¼ inch metal dowel along the long length of the panel with the coated side facing out. The bent coupons were then placed onto a block of metal where a wedge was pre-cut out of it with a taper of 0 to ¼ inch along a 4.5 inch length. Once placed in the wedge, each bent coupon was struck with a block of metal which weighed 2.1 kilograms from a height of 11 inches to form a wedge where one end of the coated metal impinged upon itself and a ¼ inch space remained on the opposite end. The wedge bent panels were then placed into an aqueous solution of copper sulphate and hydrochloric acid for two minutes to purposely etch the aluminum panel in areas where the coatings failed and cracked. The etched wedge bent panels were then examined through a microscope at 1.0× power to determine how far from the impinged end along the bent radii did the coating crack. Flex results are reported as the percentage of cracked area versus total length of the wedge bent panel.

[3] Blush Resistance: Blush resistance measures the ability of a coating to resist attack by various testing solutions. When the coated film absorbs test solution, it generally becomes cloudy or looks white. Blush is measured visually using a scale of 0-10 where a rating of "10" indicates no blush and a rating of "0" indicates complete whitening of the film. The coated panel tested is 2×4 inches (5×10 cm) and the testing solution covers half of the panel being tested so you can compare blush of the exposed panel to the unexposed portion.

[4] Adhesion: Adhesion testing is performed to assess whether the coating adheres to the substrate. The adhesion test is performed according to ASTM D3359—Test Method B, using Scotch 610 tape, available from 3M Company of Saint Paul, Minn. Adhesion is generally rated on a scale of 0-5 where a rating of "5" indicates no adhesion failure and a rating of "0" indicates no adhesion.

[5] Joy Detergent Test: The "Joy" test is designed to measure the resistance of a coating to a hot 180° F. (82° C.)

Joy detergent solution. The solution is prepared by mixing 30 grams of Ultra Joy Dishwashing Liquid (product of Procter & Gamble) into 3000 grams of deionized water. Coated strips are immersed into the 180° F. (82° C.) Joy solution for 10 minutes. The strips are then rinsed and cooled in deionized water, dried, and immediately rated for blush as described previously.

[6] Dowfax Detergent Test: The "Dowfax" test is designed to measure the resistance of a coating to a boiling detergent solution. The solution is prepared by mixing 5 grams of DOWFAX 2A1 (product of Dow Chemical) into 3000 grams of deionized water. Coated strips are immersed into the boiling Dowfax solution for 15 minutes. The strips are then rinsed and cooled in deionized water, dried, and immediately rated for blush as described previously.

[7] Acetic Acid Test: The "Acetic Acid" test is designed to measure the resistance of a coating to a boiling 3% acetic acid solution. The solution is prepared by mixing 90 grams of Glacial Acetic Acid (product of Fisher Scientific) into 3000 grams of deionized water. Coated strips are immersed into the boiling Acetic Acid solution for 30 minutes. The strips are then rinsed and cooled in deionized water, dried, and immediately rated for blush as described previously.

[8] Deionized Water Retort Test: The "DI Water Retort" test is designed to measure the resistance of a coating to deionized water. Coated strips are immersed into the deionized water and placed in a steam retort for 30 minutes at 250° F. (121° C.). The strips are then cooled in deionized water, dried, and immediately rated for blush as described previously.

[9] Solvent Fraction Test and film weight test (msi): Solvent Fraction is a test designed to measure the degree of cure of a coating. If the panel is coated on both sides, remove the coating from the side of the panel not being tested. Punch out a four square inch disk in the hole puncher. Weigh disk on a four place balance. This is the "initial weight". Place samples into racks and soak in MEK (Methyl Ethyl Ketone) for 10 minutes. Remove samples and place into 400° F. (204° C.) oven for 2 minutes, remove, cool, and weigh again. This value is the "post bake weight". Next, place the disk into Sulfuric Acid (A298-212 Technical Grade available from Fisher Scientific) for 3 minutes to strip the coating from the metal. Rinse the panel with water to remove coating completely, dry panel and re-weigh. This is the "final weight". The equation used to determine Solvent Fraction is:

$$\frac{(\text{Initial weight} - \text{Post Bake weight})}{(\text{Initial weight} - \text{Final weight})} \times 100 = \text{Solvent Fraction}$$

The lower the number for Solvent Fraction, the better the cure. Film weight in milligrams/square inch (msi)=Initial weight (mg)–final weight (mg). Since disk is 4 square inches, divide by 4 to give the msi in mg/square inch.

Examples 5-10

The Latex of Example M was placed into an appropriately sized package. To the package was added enough deionized water to bring the final solids of the formulated polymer to 28%. The mixture was agitated using an overhead air supplied stirrer attached with a paddle blade. The crosslinker was added and held under agitation until the resulting mixture became homogenous.

The formulations shown below were drawn down on 0.0082" aluminum substrate and baked for 10 seconds in a conveyor oven. Different oven temperatures were used in order for the substrate to obtain Peak Metal Temperatures ranging from 400° F. (204° C.) to 450° F. (232° C.). The baked films have a Dry Coating Weight of 7 mg/square inch when measured using a Strand gauge.

Example 5

To the Latex Example M, each crosslinker shown in Table 2 was added to obtain an Acid/Oxazoline ratio of 1:0.15. Both sets of panels were baked to a Peak Metal Temperature of 450° F. (232° C.). As shown in Table 2, when compared to the WS500, Oxazoline Example B gave better resistance to Acetic Acid Blister and better Water Retort Blush. It gave similar Wedge Bends. It also gave lower but still acceptable MEK Resistance.

TABLE 2

| Acid/Oxazoline ratio | Crosslinker | MEK DR[1] | Wedge Bend Avg | Acetic Acid Blush | Acetic Acid Blister[2] | Water Retort Blush |
|---|---|---|---|---|---|---|
| 1:0.15 | EPOCROS WS500 | 56 | 19 | 6 | F | 7 |
| 1:0.15 | Oxazoline Example B | 24 | 23 | 4 | P | 8 |

[1] After baking, the resulting coatings were checked for MEK solvent resistance by determining the number of double rubs by hand it took to soften and break through the coating with a rag saturated with Methyl Ethyl Ketone.

[2] Blister resistance is a Pass/Fail test. Each panel was visually inspected for the presence of blistering. Blistering is evidenced by the formation of bubbles in the coating during the Acetic Acid and Water retort tests. A Pass rating is given if there is no detectable blistering of the coating.

Example 6

Tri-Functional Oxazoline

To the Latex Example M, enough of Oxazoline Example D was added to obtain Acid/Oxazoline ratios of 1:0.10 and 1:0.25. In Table 3, the coated panels were baked to a Peak Metal Temperature of 450° F. (232° C.). When compared to HRJ-13078, Oxazoline Example D gave equal resistance to Acetic Acid and Water Retort tests. It gave slightly higher, but acceptable Wedge Bends. It also gave slightly lower but still acceptable MEK Resistance.

TABLE 3

| Crosslinker | % X-linker | Acid/Oxazoline Ratio | PMT | MEK DR | Wedge Bend Avg | Acetic Acid Blush | Acetic Acid Adh | Acetic Acid Blister | Water Retort Blush | Water Retort Adh | Water Retort Blister |
|---|---|---|---|---|---|---|---|---|---|---|---|
| Oxazoline Example D | 0.85% | 1:0.10 | 450° F. | 91 | 17 | 6 | 5 | P | 8 | 5 | P |
| Oxazoline Example D | 2.10% | 1:0.25 | | 63 | 17 | 6 | 5 | P | 9 | 5 | P |
| HRJ-13078 | 4% | | | 100 | 12 | 6 | 5 | P | 9 | 5 | P |

Example 7

Tri-Functional Oxazoline

In Table 4, the formulations from Example 6 were coated onto panels and baked to a Peak Metal Temperature of 400° F. (204° C.). When compared to HRJ-13078, Oxazoline Example D gave equal resistance to Acetic Acid and Water Retort tests. It gave improved Wedge Bends. It also gave improved MEK Resistance.

TABLE 4

| Crosslinker | % X-linker | Acid/Oxazoline Ratio | PMT | MEK DR | Wedge Bend Avg | Acetic Acid Blush | Acetic Acid Adh | Acetic Acid Blister | Water Retort Blush | Water Retort Adh | Water Retort Blister |
|---|---|---|---|---|---|---|---|---|---|---|---|
| Oxazoline Example D | 0.85% | 1:0.10 | 400° F. | 17 | 13 | 4 | 5 | P | 8 | 5 | P |
| Oxazoline Example D | 2.10% | 1:0.25 | | 22 | 14 | 4 | 5 | P | 8 | 5 | P |
| HRJ-13078 | 4% | | | 8 | 18 | 4 | 5 | P | 9 | 5 | P |

Example 8

Tetra-Functional Oxazoline

To the Latex Example M, enough of Oxazoline Example E was added to obtain Acid/Oxazoline ratios of 1:0.10 and 1:0.03. In Table 5, coated panels were baked to a Peak Metal Temperature of 450° F. (232° C.). When compared to HRJ-13078, Oxazoline Example E gave equal resistance to Acetic Acid and Water Retort tests. It gave equal Wedge Bends. It also gave lower but still acceptable MEK Resistance.

TABLE 5

| Crosslinker | % X-linker | Acid/Oxazoline Ratio | PMT | MEK DR | Wedge Bend Avg | Acetic Acid Blush | Acetic Acid Adh | Acetic Acid Blister | Water Retort Blush | Water Retort Adh | Water Retort Blister |
|---|---|---|---|---|---|---|---|---|---|---|---|
| Oxazoline Example E | 1.8% | 1:0.10 | 450° F. | 68 | 11 | 6 | 5 | P | 8 | 5 | P |
| Oxazoline Example E | 0.3% | 1:0.03 | | 67 | 11 | 6 | 5 | P | 8 | 5 | P |
| HRJ-13078 | 4% | | | 100 | 12 | 6 | 5 | P | 9 | 5 | P |

Example 9

Tetra-Functional Oxazoline

In Table 6, the formulations from Example 8 were coated onto panels and baked to a Peak Metal Temperature of 400° F. (204° C.). When compared to HRJ-13078, Oxazoline Example E gave equal resistance to Acetic Acid as well as similar MEK resistance. It gave lower Water Retort Blush. It gave improved Wedge Bends.

TABLE 6

| Crosslinker | % X-linker | Acid/Oxazoline Ratio | PMT | MEK DR | Wedge Bend Avg | Acetic Acid Blush | Acetic Acid Adh | Acetic Acid Blister | Water Retort Blush | Water Retort Adh | Water Retort Blister |
|---|---|---|---|---|---|---|---|---|---|---|---|
| Oxazoline Example E | 1.8% | 1:0.10 | 400° F. | 8 | 11 | 4 | 5 | F | 6 | 5 | P |
| Oxazoline Example E | 0.3% | 1:0.03 | | 13 | 10 | 4 | 5 | P | 7 | 5 | P |
| HRJ-13078 | 4% | | | 8 | 18 | 4 | 5 | P | 9 | 5 | P |

Example 10

1,3-Phenylene-bis-oxazoline

To the Latex Example M, 1,3-Phenylene-bis-oxazoline (1,3-PBO) was added to obtain Acid/Oxazoline ratios from 1:0.035 to 1:0.32. The panels were baked to a Peak Metal Temperature of 450° F. (232° C.). The results are reported in Table 7.

TABLE 7

| Crosslinker | % X-linker | Acid/Oxazoline Ratio | MEK DR | Wedge Bend Avg | Acetic Acid Blush | Acetic Acid Adh | Acetic Acid Blister | Water Retort Blush | Water Retort Adh | Water Retort Blister |
|---|---|---|---|---|---|---|---|---|---|---|
| 1,3-PBO | 0.25% | 1:0.035 | 54 | 8 | 6 | 5 | P | 8 | 5 | P |
| | 0.5% | 1:0.07 | 94 | 9 | 6 | 5 | P | 8 | 5 | P |
| | 1.0% | 1:0.14 | 54 | 8 | 6 | 5 | P | 8 | 5 | P |
| | 2.25% | 1:0.32 | 52 | 10 | 6 | 5 | P | 8 | 5 | P |

Examples 11-14

The Latex of Example K was placed into an appropriately sized package. To the package was added the polyoxazoline of Example F and the other coating ingredients shown in Table 8 below. The mixture was agitated using an overhead air supplied stirrer attached with a paddle blade.

TABLE 8

| Coating Ingredients | Example 11 | Example 12 | Example 13 | Example 14 |
|---|---|---|---|---|
| Example K | 65.67 | 61.71 | 60.7 | 59.69 |
| Epocros WS-500 | 0 | 3.43 | 4.3 | 5.16 |
| Byk-333[1] | 0.07 | 0.07 | 0.07 | 0.07 |
| Microspersion 523[2] | 0.31 | 0.31 | 0.31 | 0.31 |
| Ethylene Glycol | 12.48 | 12.48 | 12.48 | 12.48 |
| Amyl Alcohol | 0.96 | 0.96 | 0.96 | 0.96 |
| Ethylene Glycol butyl ether acetate | 0.96 | 0.96 | 0.96 | 0.96 |
| Dimethylethanolamine | 0.34 | 0.34 | 0.34 | 0.34 |

[1] Silicone surface additive from BYK Chemie.
[2] Aqueous dispersion of micronized polyethylene and PTFE waxes from Micropowders Inc.

Examples 11-14 were applied by #22 wire wound drawbar to pretreated aluminum substrates and cured to a Peak Metal Temperature of 465° F. (241° C.) for 12 seconds to give a dry film coating weight of 6.5-7.5 mg/square inch (msi). The coatings were evaluated for performance as summarized in Table 9.

TABLE 9

| | Enamel Raters[1] after 7 days L-85 Test Pack[2] | Aluminum Pickup (ppm)[3] after 7 days L-85 Test Pack | Blush Rating after 1% Citric Acid, 30 min at 250 F. Retort[4] | Blush Rating after 1% Joy in DI water, 10 min at 180 F. | Blush Rating after 0.165% Dowfax 2A1 surfactant in DI Water, 15 minutes at boil | Solvent Fraction |
|---|---|---|---|---|---|---|
| Example 11 | 2.48 | 0.91 | 2.5 | 6.25 | 4.5 | 3.38 |
| Example 12 | 5.88 | 1.12 | 5.75 | 7 | 6.75 | 1.76 |

TABLE 9-continued

|  | Enamel Raters[1] after 7 days L-85 Test Pack[2] | Aluminum Pickup (ppm)[3] after 7 days L-85 Test Pack | Blush Rating after 1% Citric Acid, 30 min at 250 F. Retort[4] | Blush Rating after 1% Joy in DI water, 10 min at 180 F. | Blush Rating after 0.165% Dowfax 2A1 surfactant in DI Water, 15 minutes at boil | Solvent Fraction |
|---|---|---|---|---|---|---|
| Example 13 | 8.18 | 1.2 | 6.5 | 7.25 | 7 | 3.31 |
| Example 14 | 20.55 | 1.6 | 7 | 7 | 7 | 1.87 |

[1]WACO Enamel Rater Test: The WACO Enamel Rater test determines the integrity of a fabricated can end by quantifying metal exposure. The end is secured by vacuum to the electrolyte-filled and electrode-containing end fixture. Fixture and specimen are inverted so that electrode and the product side of the end come into contact with the electrolyte solution and the edge of the sample contacts a metal chisel, completing the circuit. The instrument then applies a constant voltage (normally 6.3 VDC) across the coated surface and measures the resulting current at the industry standard of 4 seconds duration. The magnitude of the reading is directly proportional to the amount of exposed metal in the test sample. A low reading is desirable since that indicates there is very little exposed metal on the end. The ends produced for the testing were CDL type ends.
[2]Liquor 85 Test Pack (L-85): A test solution is shown below:
Deionized Water 917.3 grams
Citric Acid 92.0 grams
85% Phosphoric Acid 33.3 grams
Morton Salt (sodium chloride) with no iodine 71.0 grams
To a 12 ounce aluminum beverage can, measure out 47 grams of the above stock solution of L-85 and then add 308 grams of Sparking Water (carbonated water). Then use a CDL seamer to seam the end onto the can. The cans are then placed upside down (inverted) into a 100° F. (38° C.) incubator for a period of 7 days. After 7 days the cans are removed from the incubator, the can is punctured at the bottom to empty the liquid and the can is cut about 10 mm below the necked area of the can. The ends are then measured for Enamel raters (metal exposure) using the Waco Enamel Rater test mentioned above. An acceptable enamel rater after L-85 pack testing are numbers which are less than 10.
[3]Aluminum Pickup (ppm): After opening the L-85 pack, a sample of the L-85 liquid was taken and sent to First Environmental Laboratories, 1600 Shore Road, Suite D, Naperville, IL 60563. There it was analyzed using an ICP-AES (Inductively Coupled Plasma - Atomic Emission Spectroscopy) to determine the parts per million of aluminum in the sample.
[4]The citric acid test is designed to measure the resistance of the coating to acid as would be found in a carbonated soft drink. Coated strips are immersed in a 1% by weight citric acid solution at 250° F. (121° C.) for 30 minutes. The strips are then rinsed and cooled in deionized water, dried and immediately rated for blush as described above.

The EPOCROS WS-500 oxazoline functional crosslinker will crosslink with free acid groups in the (meth)acrylic latex and this gives improved blush resistance after exposure to 1% Citric Acid, 1% Joy and 0.165% Dowfax solutions. However, too much crosslinker hurts the flexibility and causes higher enamel raters. Example 12 gave the best balance of good L-85 pack and Blush resistance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A package coated at least in part on a surface, the coating composition comprising:
(a) a polymer comprising acid functionality, and
(b) a polyoxazoline, wherein the coating composition comprises less than 1000 ppm based on the total weight of the coating composition of formaldehyde, derivatives thereof, and residues thereof.

2. The coated package of claim 1 in which the package is a metal can.

3. The coated package of claim 1 in which the coating is applied to a food-contacting surface of the package.

4. The coated package of claim 2 in which the coating composition is applied to a can end.

5. The coated package of claim 1 in which the composition is an aqueous-based composition in which (a) and (b) are dispersed in aqueous medium.

6. The coated package of claim 1 in which the composition is an organic solvent-based composition.

7. The coated package of claim 1 in which the polymer comprising acid functionality comprises a carboxylic acid group-containing (meth)acrylic polymer.

8. The coated package of claim 1 in which the calculated molar ratio of oxazoline groups to carboxylic acid groups is from 0.03:1 to 5:1.

9. The coated package of claim 1 in which the polyoxazoline has the following structure:

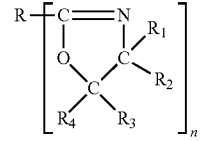

wherein n is an integer of 2 to 4; R is an n-valent organic group; and each $R_1$, $R_2$, $R_3$ and $R_4$ are independently hydrogen or a $C_1$-$C_4$ alkyl group.

10. The coated package of claim 9 where $R_2$ and $R_3$ are H.

11. The coated package of claim 9 in which R is a divalent radical selected from an arylene radical and an alkylene radical and n=2.

12. The coated package of claim 1 in which the polyoxazoline is a polymeric polyoxazoline.

13. The coated package of claim 12 in which the polymeric polyoxazoline comprises a polyester polyoxazoline or a (meth)acrylic polymer polyoxazoline.

14. The coated package of claim 13 in which the polyoxazoline has a number average molecular weight of 1,000-50,000.

15. A method of coating a package comprising:
(a) applying the coating composition of claim 1 to at least a portion of the package, prior to and/or after forming the package or a portion thereof; and
(b) heating the coated substrate to a temperature and for a time sufficient to cure the coating composition.

16. The method of claim 15 in which the package is a metal can.

17. The method of claim 16 in which the coating composition is applied to a food-contacting surface of the metal can.

18. The method of claim 16 in which the coating composition is applied to a can end.

19. The method of claim 15 in which the coating composition is an aqueous-based composition in which (i) and (ii) are dispersed in aqueous medium.

20. The method of claim 15 in which the polymer comprising acid functionality comprises a carboxylic acid group-containing (meth)acrylic polymer, a carboxylic acid group-containing polyester polymer, or mixtures thereof.

21. The method of claim 15 in which the calculated molar ratio of oxazoline groups to carboxylic acid groups is from 0.03:1 to 5:1.

22. The method of claim 15 in which the package is formed and the coating composition applied to at least a portion of the package.

23. The method of claim 15 in which the coating composition is applied to a planar substrate; the coating composition heated for a time and temperature sufficient to cure the coating composition; and the substrate formed into a package or a portion thereof.

24. The method of claim 23 in which the coating composition is applied continuously to a length of coil metal sheet stock.

25. The method of claim 15 in which the polyoxazoline has the following structure:

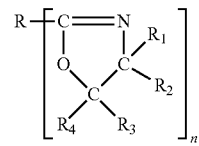

wherein n is an integer of 2 to 4; R is an n-valent organic group; $R_1$, $R_2$, $R_3$ and $R_4$ are independently hydrogen or a substituted or unsubstituted $C_1$-$C_4$ alkyl group.

26. The method of claim 25 where $R_2$ and $R_3$ are H.

27. The method of claim 25 in which R is a divalent radical comprising an arylene radical or an alkylene radical and wherein n=2.

28. The method of claim 15 in which the polyoxazoline comprises a polymeric polyoxazoline.

29. The method of claim 28 in which the polymeric polyoxazoline comprises a polyester polyoxazoline or a (meth)acrylic polymer polyoxazoline.

30. The method of claim 29 in which the polyoxazoline has a number average molecular weight of 1,000-50,000.

* * * * *